United States Patent

Huyzers

Patent Number: 5,664,796
Date of Patent: Sep. 9, 1997

[54] VEHICLE EXTENDER

[76] Inventor: Pieter Herman Huyzers, 40 Bokkermans Kloof Strt Bokkermanskloof, Houtbay, South Africa

[21] Appl. No.: 671,810

[22] Filed: Jun. 25, 1996

Related U.S. Application Data

[63] Continuation of Ser. No. 389,451, Feb. 16, 1995, abandoned.

[30] Foreign Application Priority Data

Feb. 18, 1994 [ZA] South Africa .......................... 94/1112
Oct. 6, 1994 [ZA] South Africa .......................... 94/7810

[51] Int. Cl.$^6$ .................. B62D 63/06; B60S 9/02
[52] U.S. Cl. .............. 280/400; 280/460.1; 280/475; 280/763.1; 280/789; 254/333; 254/418
[58] Field of Search .............. 280/416.1, 415.1, 280/460.1, 63, 763.1, 765.1, 406.1, 402, 456.1, 475, 504, 505, 511, 656, 789; 254/47, 48, 333, 387, 418, 419, 420, 426

[56] References Cited

U.S. PATENT DOCUMENTS

| 3,164,275 | 1/1965 | Schatzl et al. ........................ 254/47 |
| 3,877,714 | 4/1975 | Black ............................. 280/656 X |
| 4,230,340 | 10/1980 | Wasservogel ..................... 280/656 |
| 4,294,429 | 10/1981 | Desplats ....................... 254/333 X |
| 4,372,569 | 2/1983 | Otterson ............................ 280/78 |
| 4,426,097 | 1/1984 | Livingston ..................... 280/416.1 |
| 4,515,394 | 5/1985 | Zwick ............................ 280/764.1 |
| 4,645,230 | 2/1987 | Hammons ......................... 280/656 |
| 5,397,148 | 3/1995 | Nelson ......................... 280/416.1 |

FOREIGN PATENT DOCUMENTS

| 123712 | 5/1983 | European Pat. Off. . |
| 669 772 | 5/1935 | Germany ....................... 254/86 |
| 3222602 | 6/1982 | Germany . |
| 728378 | 11/1951 | Niger . |
| 879241 | 12/1987 | South Africa . |
| 413527 | 7/1934 | United Kingdom . |
| 2190054 | 5/1986 | United Kingdom . |

Primary Examiner—Brian L. Johnson
Assistant Examiner—Victor E. Johnson
Attorney, Agent, or Firm—Jacobson, Price, Holman & Stern, PLLC

[57] ABSTRACT

A vehicle extender is connected to a towing vehicle by way of a towing beam bolted to the normal tow hitch and presenting two ball and socket joints so that the vehicle extender can pitch upwardly and downwardly but cannot yaw from left to right nor roll clockwise or anti-clockwise relative to the vehicle. The vehicle extender has a single castor mounted wheel set so located that even in reversing mode in which by castor action the wheel set swivels to a forward located position the center of gravity of a load in the vehicle extender such as sand still remains forwardly of the horizontal axis of rotation of the wheels of the wheel set providing for security and stability in use. The vehicle extender is very adaptable to different applications.

8 Claims, 13 Drawing Sheets

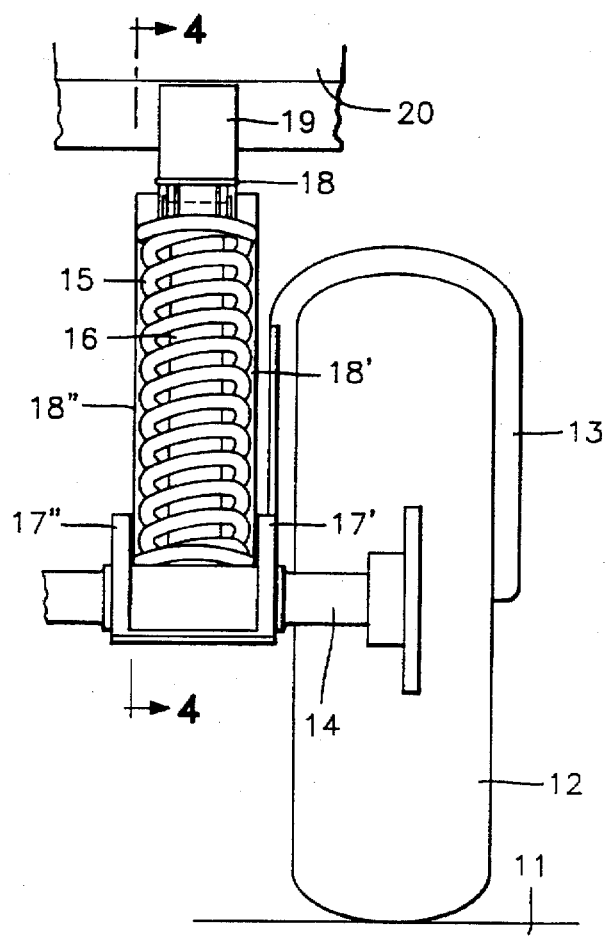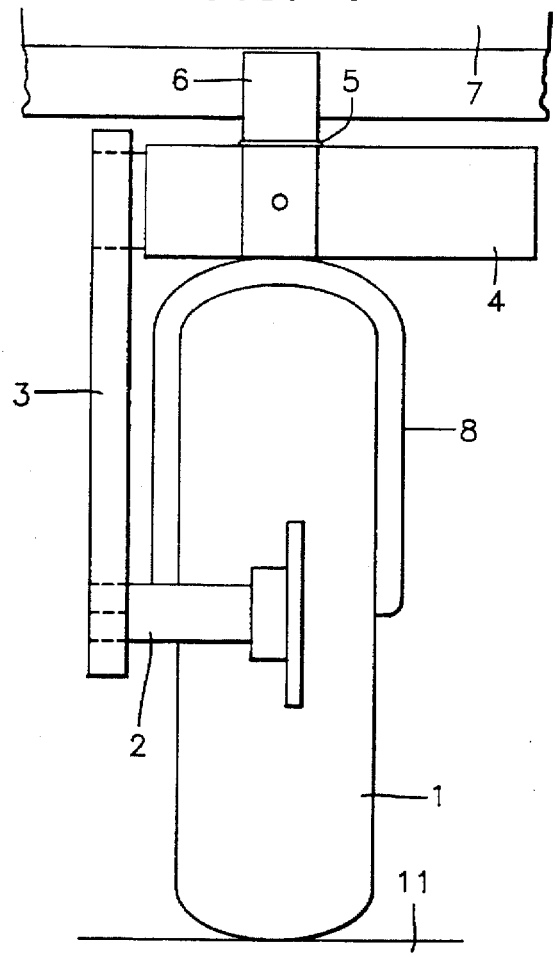

VEHICLE EXTENDER

This is a Continuation of application Ser. No 08/389,451, filed Feb. 16 1995 which was abandoned upon the filing hereof.

BACKGROUND OF THE INVENTION

The invention lies in the field of vehicles and provides a vehicle extension which enhances the usefulness of a vehicle to which it is connected. Trailers which can be attached to the rear of a motor vehicle are very popular both with private individuals and with business offering a cheap and easy method of increasing the load space of a vehicle. However, conventional trailers swing in the horizontal about their singular ball joint attachment to the drive vehicle; the vehicle-trailer combination is considerably longer than the vehicle alone. Accordingly parking of the drive vehicle with a trailer attached can be tricky and in addition, the danger of jack-knifing the drive vehicle and trailer while reversing is always present.

South African patent No 87/9241 describes a trailer incorporating a swivelable wheel set and connected to the vehicle at two points, characterised in that the wheel set swivels in the manner of caster wheels under the trailer body when steering the vehicle around curves. This design shortens the overall length of vehicle and trailer and offers the potential for easier reversing, since the trailer is not swingable relative to the vehicle and jack-knifing is no longer possible. However, a single wheel set trailer can display certain disadvantages, especially when the trailer and drive vehicle to which the trailer is attached are being reversed. In particular, reversing may result in the trailer tipping downwards at the rear, a rear portion of the trailer digging into the ground and the front portion of the trailer lifting the rear of the vehicle, possibly causing loss of control or damage to both the drive vehicle and/or trailer. This arises because of the manner in which the wheel set is arranged to swivel towards the front of the trailer when reversing, giving inadequate support towards the rear of the trailer.

SUMMARY OF THE INVENTION

A need exists to provide a trailer incorporating a single load bearing wheel set, and double point attachment to the vehicle, with attendant advantages of that, but avoiding the disadvantage described.

The invention accordingly provides a vehicle extender provided with means for connection to a towing vehicle in a manner adapted to restrict its swingable movement relative to the towing vehicle, including a single, caster action, load bearing wheel-set attached to the extender, the wheel set swivelably attached to a rear portion of the extender so that a horizontal axis of rotation of the wheel-set does not extend forwardly of a centroid of a load space of the extender.

The centroid of the load space of the vehicle extender is the centre of gravity of the load located in the load space where the load is distributed evenly in the load space, like a load of sand, for example. The effect of this arrangement is that even in reversing mode, when the wheel set swings to a position nearer to the attachment to the towing vehicle, the centre of gravity of such a load as sand acts on a line located between the wheel set axis and the towing attachment, not rearwardly of it. The result achieved is that the force at the towing attachment is still downward on the towing vehicle, not upward and the trailer does not have a tendency to tip downwards at the rear during reversing.

As a result of these features the trailer according to this invention can be better conceived of as an extension to the towing vehicle or vehicle extension, rather than a trailer and the term "vehicle extender" more accurately describes the product.

Accordingly, for convenience of terminology the term "extender" will also be used in this specification.

The wheel set preferably includes:

an upright shaft attached to the extender and attached thereto a suspension device, itself attached to at least one wheel.

"Upright" means vertical or approximately vertical. The shaft may have available on it a bush which carries the suspension device. The bush is capable of swivelling about the shaft. In addition, the fixed shaft may have attached to it, a device to regulate the swivelling of the bush around the shaft. This device may be a frictional damper of oscillation, e.g. a friction washer. Other oscillation damping means can be used.

Alternatively or in conjunction with the above, the axis of the shaft may be at an angle with respect the vertical. In this manner, the bush preferably swivels about the axis of the shaft as opposed to a vertical axis. A plane of swivelling of the attached wheel set may accordingly be offset with respect to the horizontal.

By placing the shaft at an angle with respect the horizontal as hereinbefore described, a lifting of a portion of the trailer with respect the surface on which it is travelling when the trailer is induced to travel in a reverse direction may be caused. This may be caused by arranging the axis in a vertical longitudinally directed plane (longitudinally means in the direction of forward movement) and inclined forwardly, i.e. as if the axis is falling forwards.

The castor action is arranged so as to induce the wheel set to trail behind the shaft with respect to the desired direction of travel of the vehicle, i.e. by displacing the shaft with respect to the horizontal axis of rotation of the wheel set.

The suspension device of the wheel-set may be offset with respect to the shaft.

The vehicle extender is preferably attached to a towing vehicle by at least two attachment points, a convenient means is ball joints. The attachment points are preferably located on a front face of the extender. The extender may pivot about the points of attachment with respect the drive vehicle in a pitching movement but the swingable movement (or "yawing" in aeronautical terminology) is restricted. The attachment of the extender to the drive vehicle by at least two attachment points prevents a yawing motion of the extender with respect the drive vehicle. Thus, the danger of jack-knifing the drive vehicle and extender is in effect eliminated. In addition, the extender may now act as an extension of the drive vehicle allowing for easier parking etc.

Two balls may be fixed onto a towing beam which is bolted to the rear of the towing vehicle and the vehicle extender will have at its front edge two sockets which will join with the balls, allowing pitching movement but restricting yawing movement.

The vehicle extender is preferably adapted to receive a spare wheel. One or all of the wheels included in a wheel set may include a mudguard. A portion of the extender may be so shaped so as to reduce wind resistance. Preferably the front of the extender is tapered for this purpose.

In one embodiment of the invention the wheel set includes:

one wheel rotatably attached to a suspension device attached to a a bush attached to and swivelable around an upright shaft, the shaft attached to the vehicle extender.

Preferably the shaft is attached to an underside of a vehicle extender. The suspension device may include a suspension arm and a biasing unit.

The biasing unit may, for example, be that of a "RUBAX", (Trade Mark) suspension. Thus the suspension arm may be offset with respect to the horizontal and be biased by the "RUBAX" suspension biasing unit to remain in such a position. The "RUBAX" suspension biasing unit accordingly allows for pivotal movement of the suspension arm in a vertical plane.

The suspension arm may be offset with respect the horizontal.

In a further embodiment of the invention, the wheel set includes:

at least two wheels rotatably attached to at least one side arm pivotally attached to a bush attached to and swivelable around a shaft, the shaft attached to the underside of the vehicle extender.

Preferably the bush is attached to the at least one side arm by means of a suspension device. There may exist two side arms pivotally attached to the bush. Preferably the bush includes at least one extension which extends down from the point of attachment of the bush to the shaft. The extension could be in the form of two extension arms or in the form of a tube. The side arms may be pivotally attached to the extension of the bush by means of, for example, at least one hinge pin.

Both wheels may be attached to an axle. The axle may extend through the two side arms and in so doing serve to attach the two wheels rotatably to the two side arms thereby forming a U shape.

The suspension unit may be that of a hydraulic shock absorber or a spring or preferably both. The suspension unit is preferably attached to the bush and to each of the two side arms, the suspension unit at an angle with respect the upright shaft attached to the underside of the trailer. The suspension unit accordingly biases the two side arms away from the underside of the trailer and allows for their pivotal movement about the bush extension.

In both of the abovementioned embodiments there is preferably situated under the bush a friction washer. The bush itself may incorporate a grease nipple or it may be a sealed unit, i.e. lifetime lubricated.

In use the horizontal axis of rotation of the wheel or wheels in the abovementioned embodiments trail behind the axis of the shaft in the direction of travel, i.e. a caster wheel arrangement.

The vehicle extender is preferably adapted to have fitted to it or include at least one extendible leg allowing for support of the extender when not attached to a drive vehicle. A leg may accordingly be situated at each periphery of the extender, e.g. at each corner.

The legs may be fitted to the vehicle extender, e.g clipped into place, but preferably they are included on the extender. Thus, for example, the legs may be folded down from a stored position to an extended position and retained in that position. The legs may interact with a device or apparatus to retain them either in their extended or a retracted positions. The legs may have a wheel fitted to their foot. Preferably the wheel is capable of swivelling about a vertical axis of the leg, e.g. the wheel is that of a caster wheel.

In a preferred embodiment of the invention the legs are stored, when not in use i.e. in their retracted position, against the side of the trailer in a vertical or approximately vertical position. The legs may be retained in any position by a retaining device, e.g. a screw or similar device.

The legs are preferably U-shaped in cross section and are retained in either the extended or retracted position by a carrier strap interacting with a hoist box.

The hoist box has a body part which is preferably tubular in shape and allows the leg to pass through it.

The hoist box preferably includes the following:

a floating wheel a slot fixed jack wheel and a fixed wheel all housed within the tubular body. The floating wheel is preferably located at a position below that of the jack wheel in the hoist box with respect to the surface on which the trailer is to be supported. The floating wheel may have a smooth outer surface but the jack wheel preferably has a knurled outer surface.

The carrier strap may be attached to an upper portion of the leg above the hoist box. The carrier strap is preferably attached to a back portion of the U of the U-shaped leg. The attachment of the carrier strap to the leg may be effected in any manner, e.g. by means of at least one adhesive etc, but it is preferably carried out by means of at least one rivet.

The carrier strap preferably extends around under the floating wheel in the hoist box and back over the top of the jack wheel, the carrier strap is then centred back into approximately the centre of the leg by means of the fixed wheel. The carrier strap is preferably attached to a lower portion of the leg, i.e. below the hoist box type arrangement, by a tension spring.

The jack wheel is adapted to interact with a device to facilitate in raising or lowering the leg. Thus a shaft of the wheel may extend out from the hoist box to interact with a spanner or jack or other device which facilitates turning of the jack wheel. Preferably a square portion of the wheel extends from the side of the hoist box along an axis of rotation of the wheel. This square portion is preferably capable of interacting with a spanner or the like to rotate the wheel.

By rotating the jack wheel in a first direction the leg is raised by the carrier strap as attached to the tension spring in the lower portion of the leg. The jack wheel interacts with both the carrier strap and the floating wheel, the floating wheel pushing the carrier strap against the back portion of the U in the U-shaped leg by interaction with the jack wheel. The tensioning of the carrier strap brings the floating wheel into contact with the jack wheel, the carrier strap passing between the two. The rotation of the jack wheel accordingly rotates the floating wheel in an opposite direction which by an action against the strap as pushed against the leg, pulls on the leg thereby causing the leg to be raised.

By turning the jack wheel in an opposite direction the leg may be lowered. By removing the spanner from the extending square portion of the jack wheel, rotation of the jack wheel is accordingly restricted and the leg is effectively locked in position.

DRAWING DESCRIPTION

The invention will now be described with reference to the following non-limiting illustrations in which:

FIG. 1 is a front elevation of a first embodiment of a wheel set of the invention;

FIG. 3 is a rear elevation of a second embodiment of a wheel set of the invention;

Figure 10:
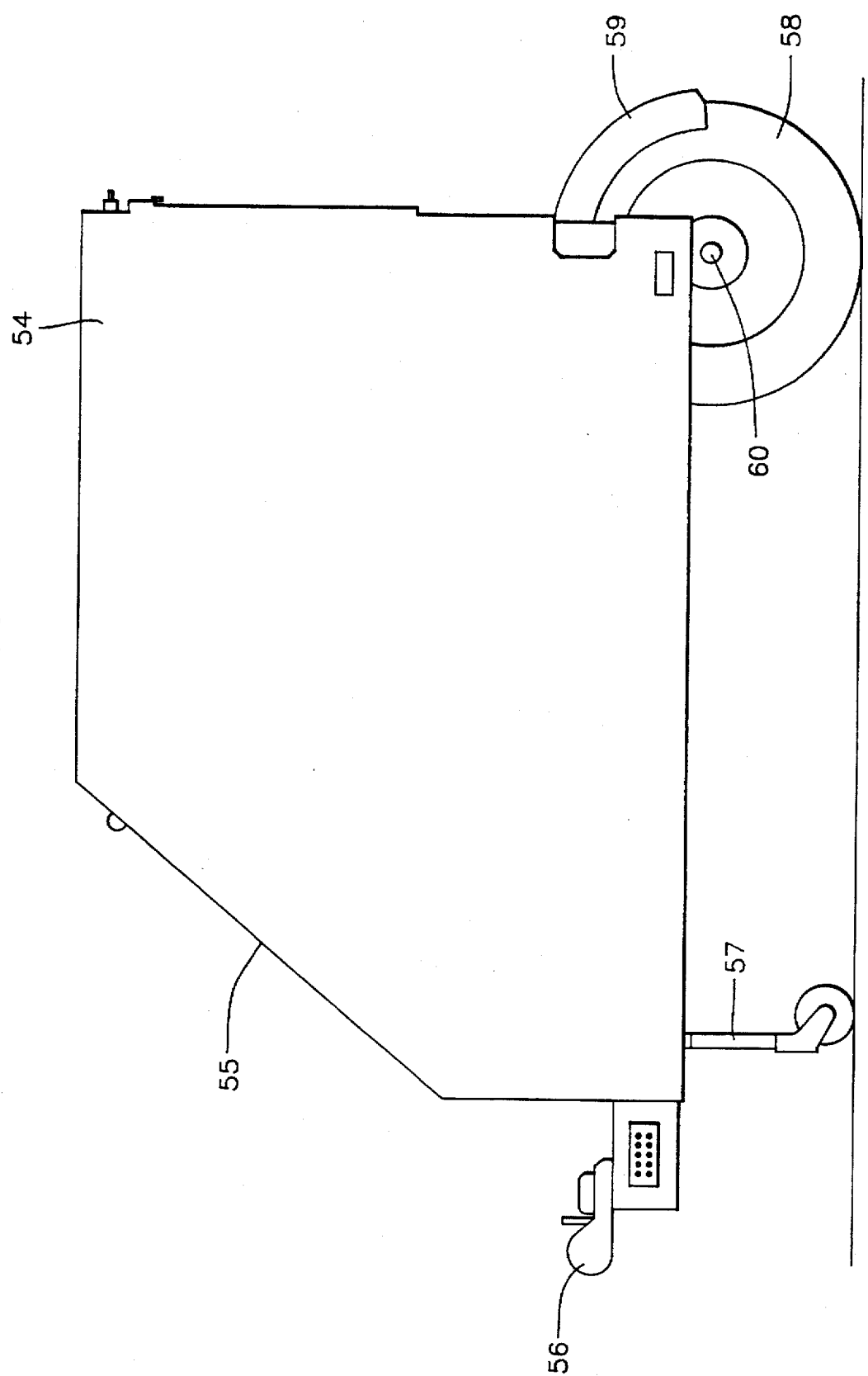
Figure 11:
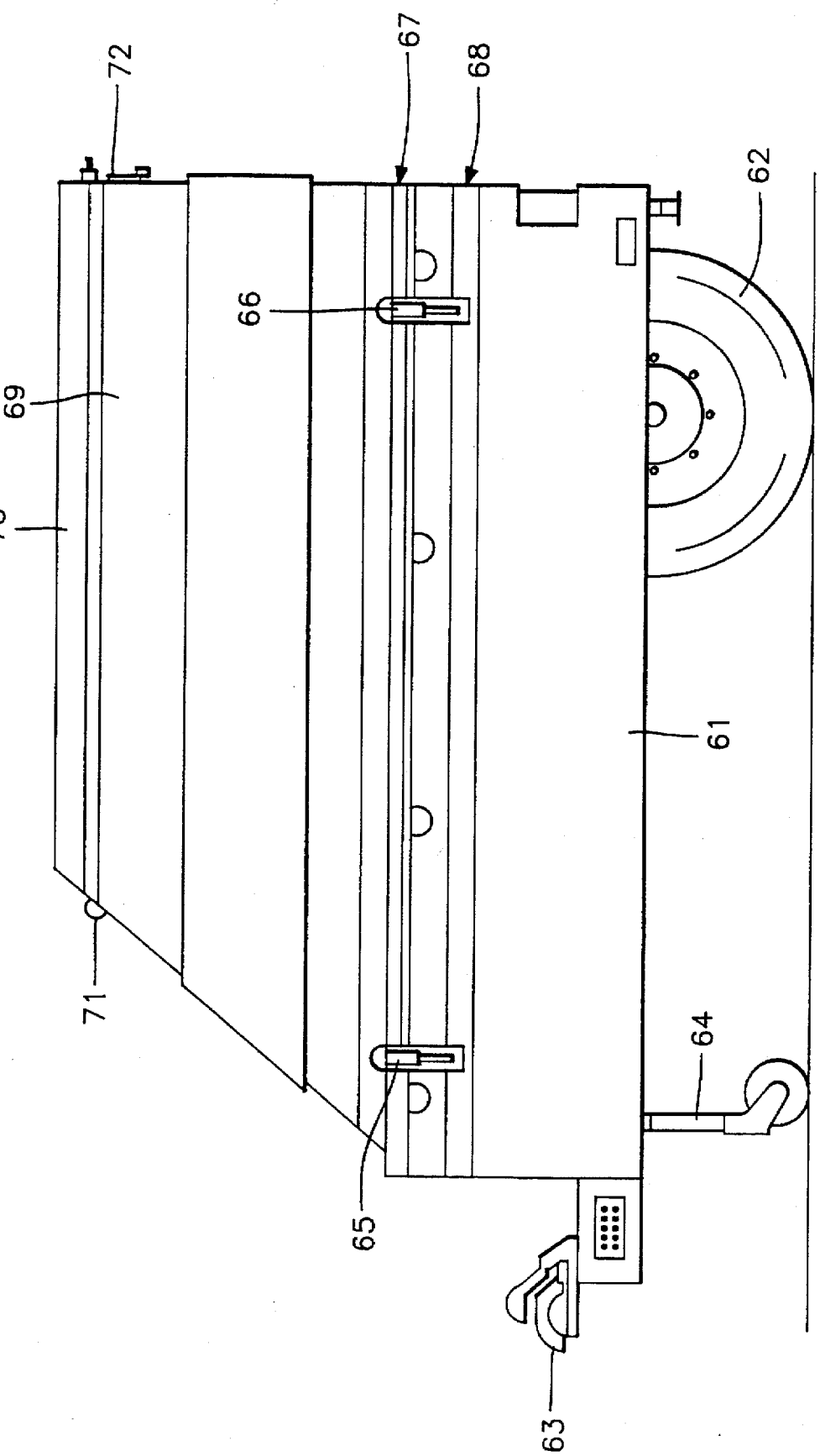
Figure 12:
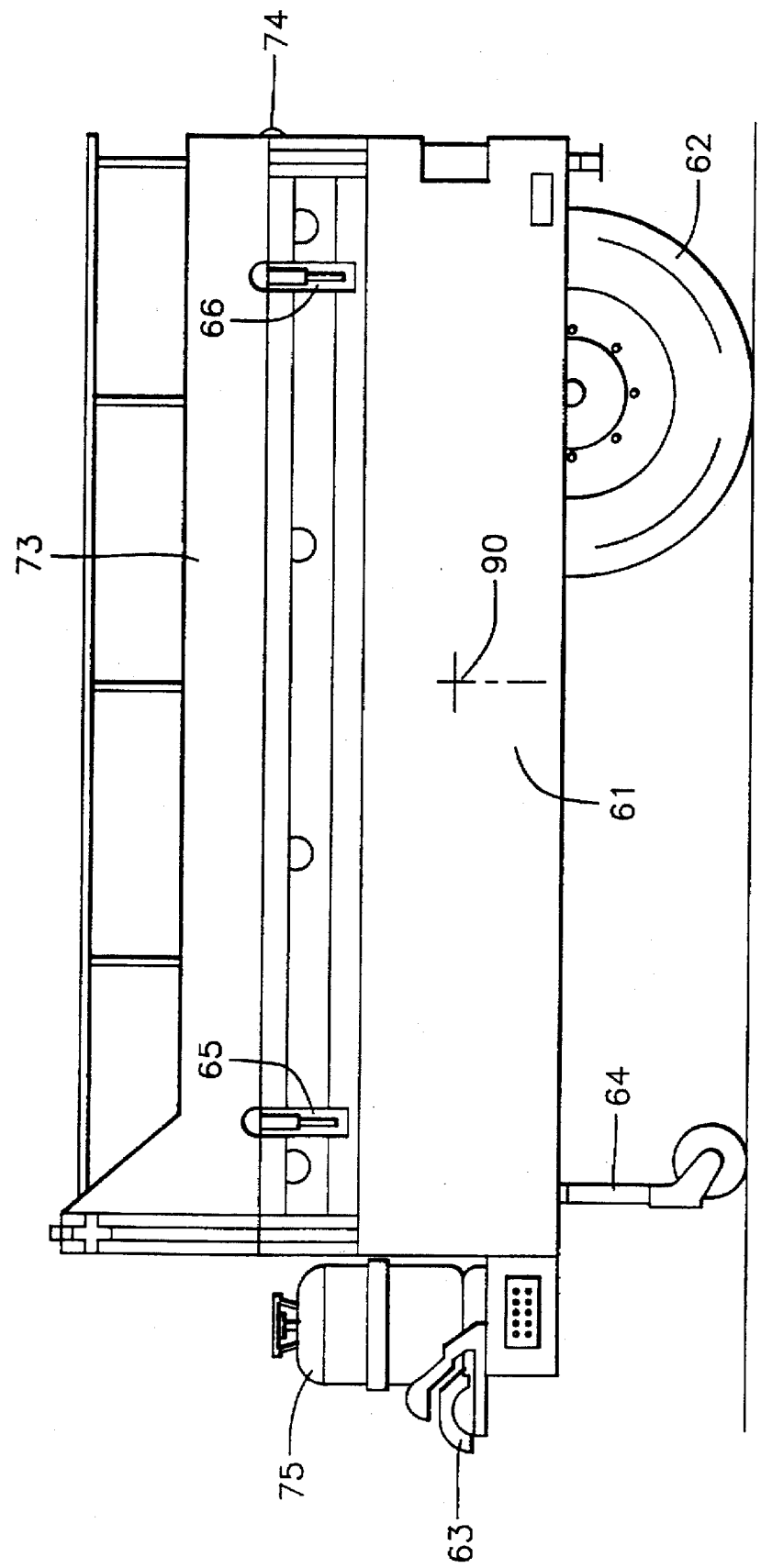
Figure 13:
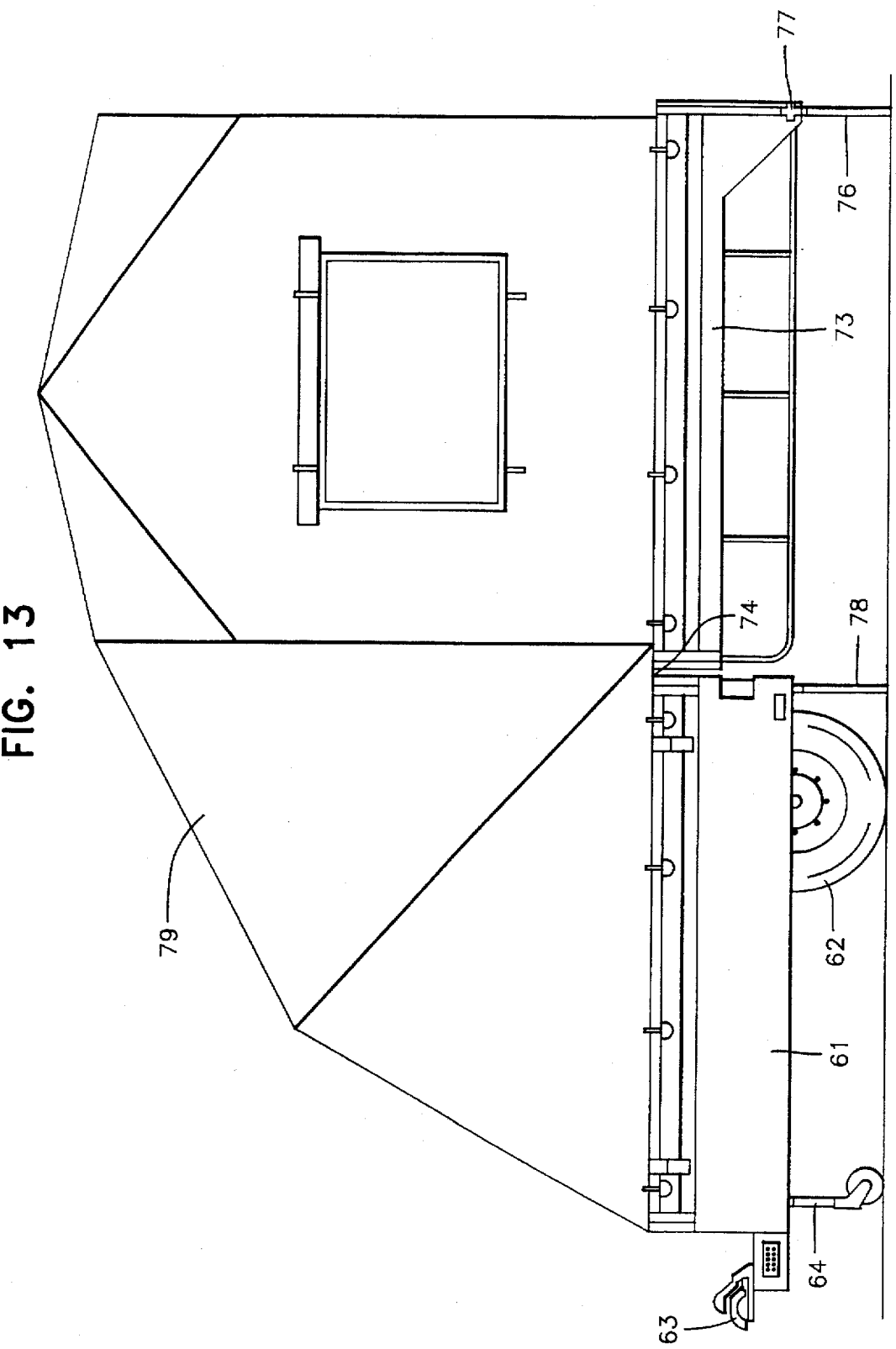
Figure 14:
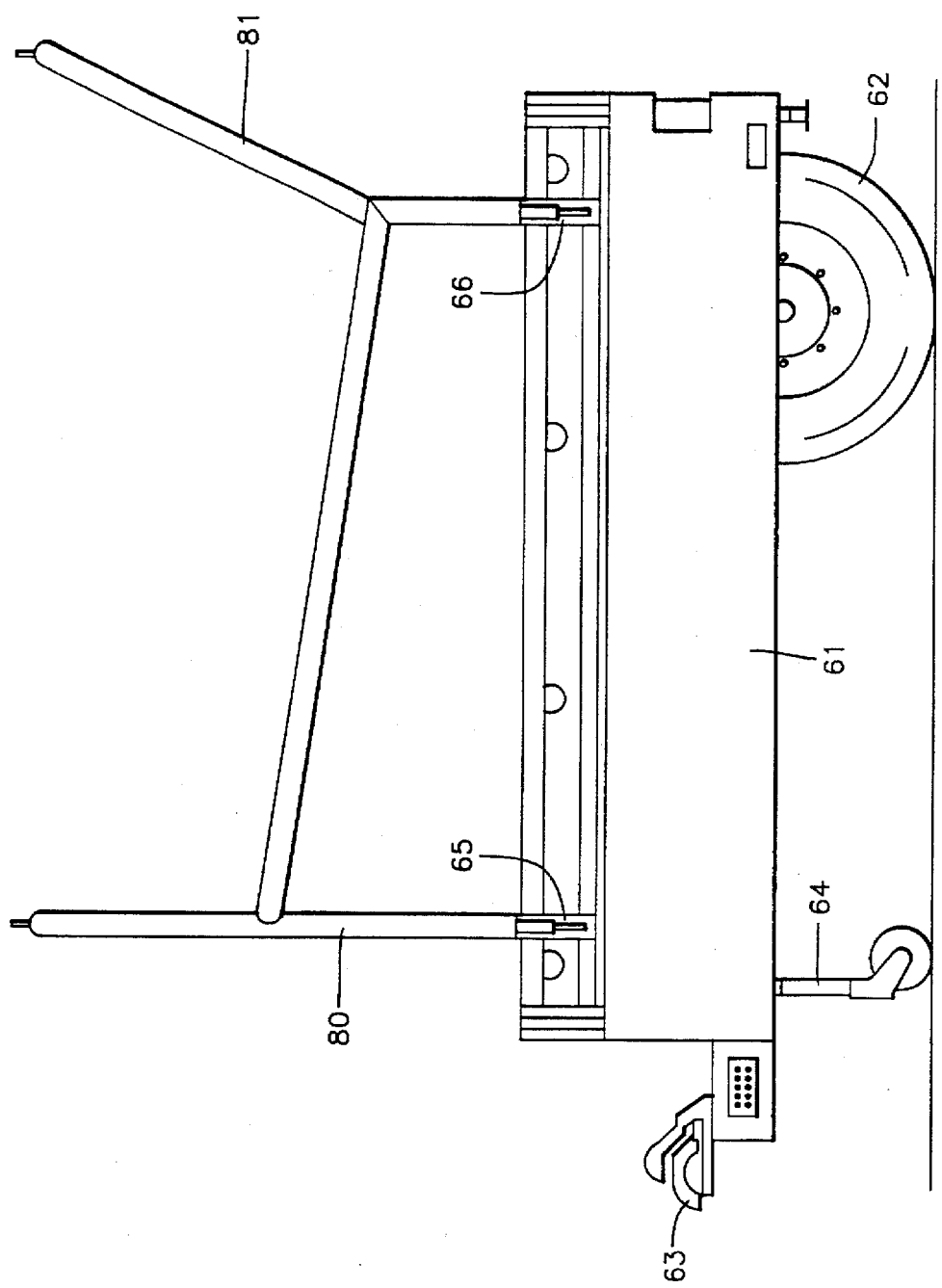
Figure 15:
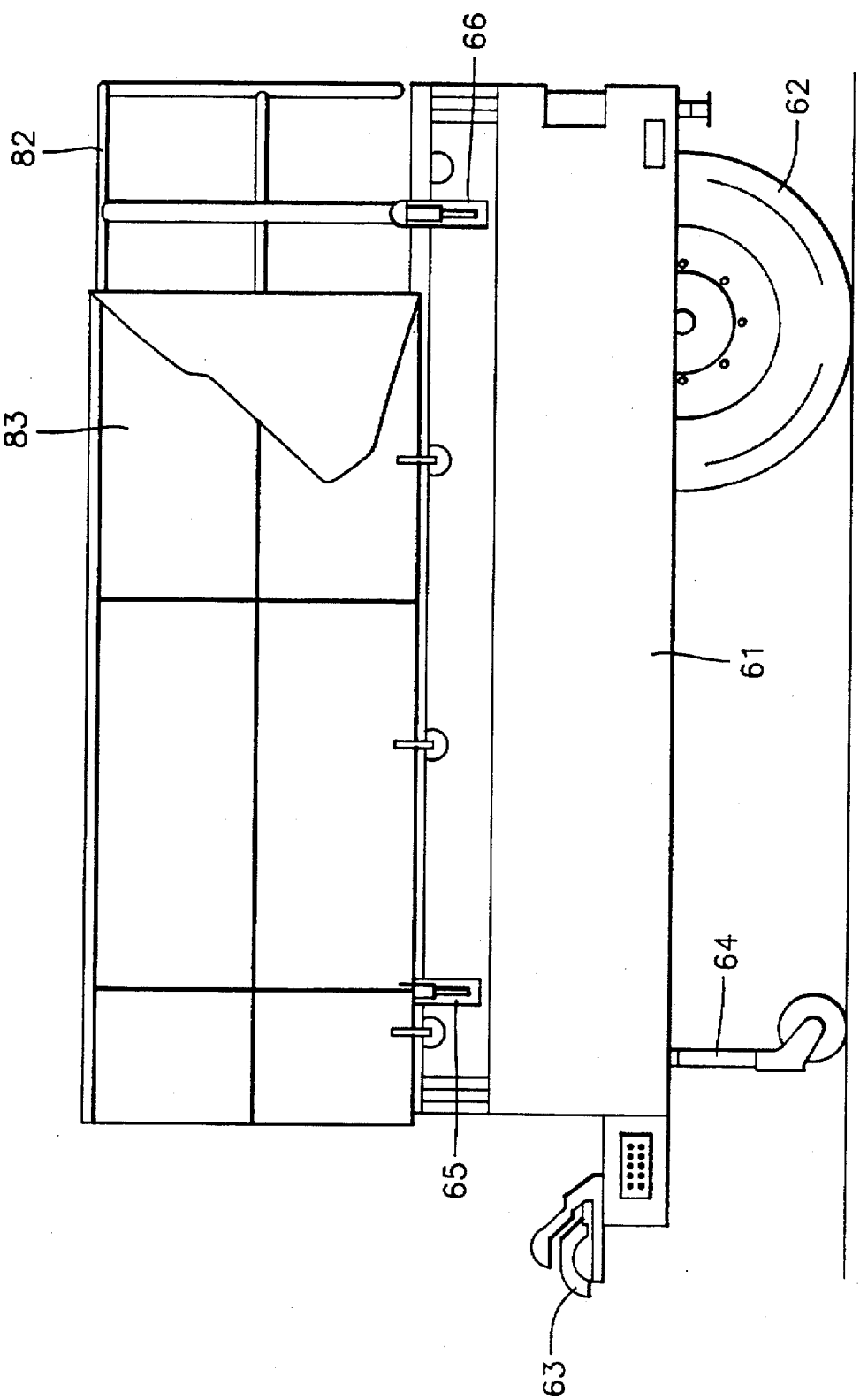
Figure 16:
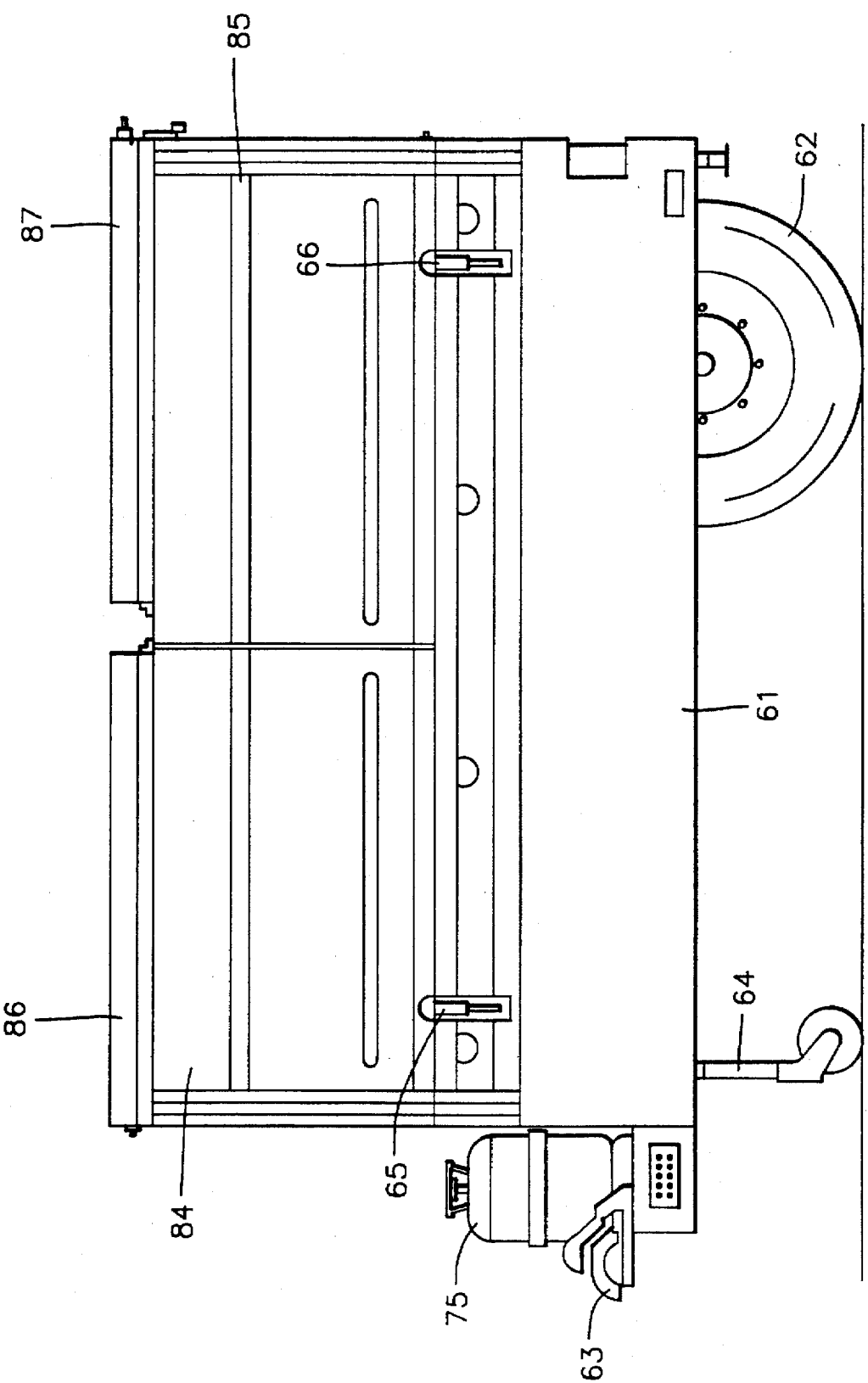

FIG. 10 is a side elevation of a vehicle extender in accordance with the invention, FIG. 11 is a side elevation of the convertible vehicle extender in accordance with the invention, FIG. 12 is a side elevation of the convertible vehicle extender of FIG. 11 duly converted to a "camper" application, FIG. 13 shows the "camper" vehicle extender of FIG. 12 duly adapted to serve as a camping tent, FIG. 14 is a side elevation of the convertible vehicle extender of FIG. 11 shown in another application, FIG. 15 is a side elevation of the convertible vehicle extender of FIG. 11 shown in a still further application, and FIG. 16 is a side elevation of a convertible vehicle extender of FIG. 11 shown in a final application.

DETAILED DESCRIPTION

Figure 2:
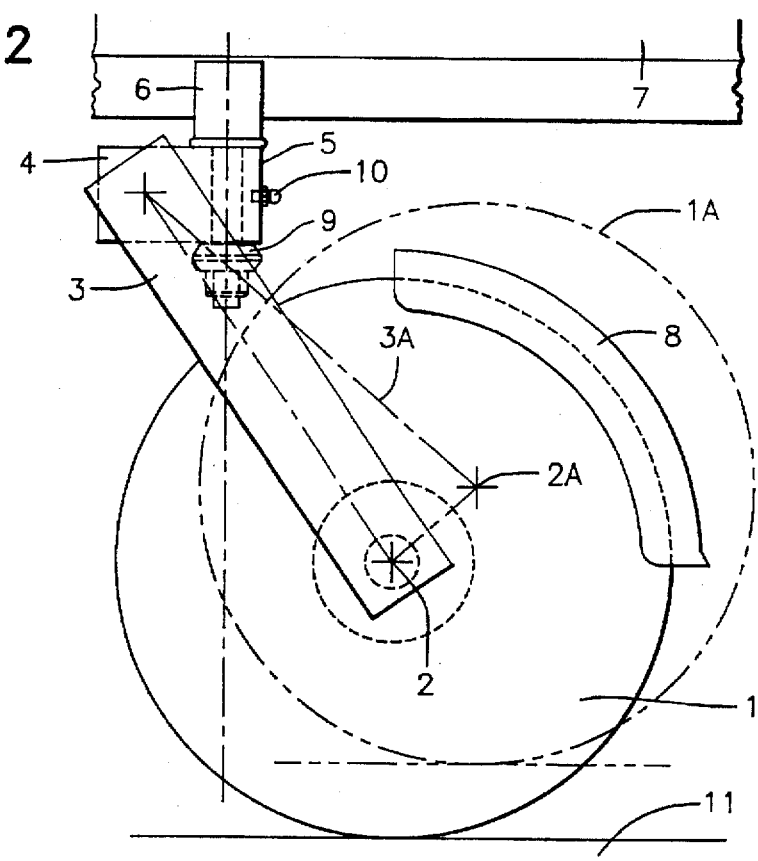
FIG. 2 is side elevation of a first embodiment of a wheel set of the invention.

In FIGS. 1 and 2 a tire 1 is resting on a surface 11. The tire is rotatably attached by way of a short axle 2 to a suspension arm 3 which is pivotally attached to a "RUBAX" (Trade Mark) suspension biasing unit 4. The "RUBAX" suspension biasing unit 4 is attached to a bush 5 which is attached to an upright shaft 6, the shaft 6 attached to an underside of a vehicle extender 7. The bush 5 is swivelable around the upright shaft 6. The bush is equipped with a grease nipple 10 and has positioned under it a frictional damper of oscillation in the form of a friction washer 9. The suspension arm 3 is at a 52° angle with respect the horizontal although the "RUBAX" suspension biasing unit allows the suspension arm to move to a position of up to 36° with respect the horizontal. The tire 1, axle 2 and suspension arm 3 may accordingly be moved to positions 1A, 2A and 3A when the extender 7 is under load.

Figure 2A:
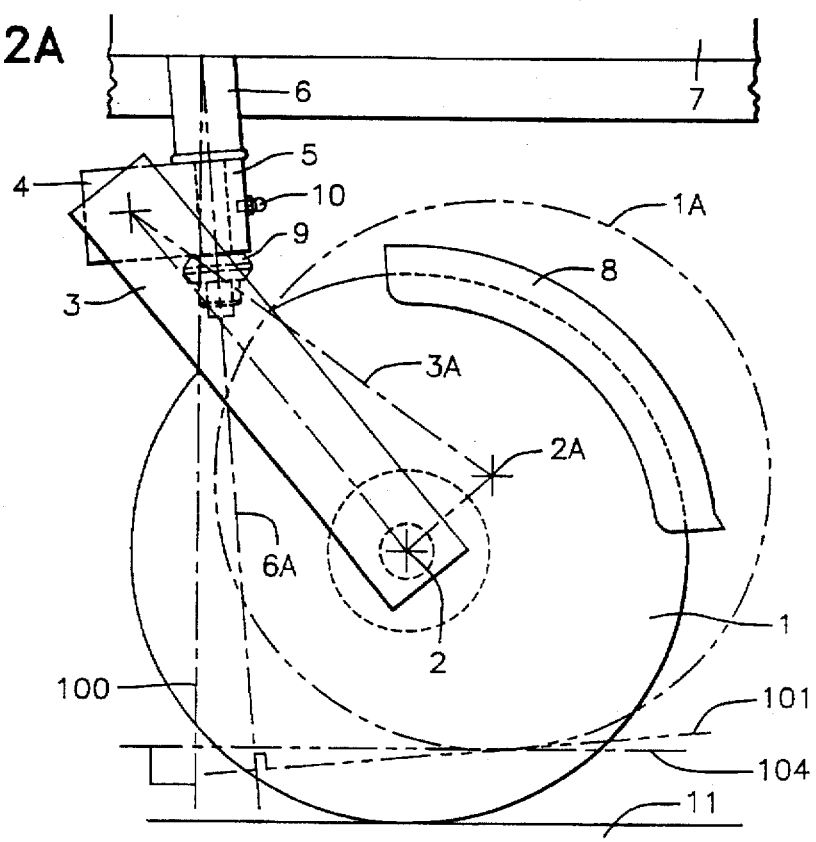
FIG. 2A is a side elevation illustrating a variation of the first embodiment wherein an upright shaft is at an angle with respect to the vertical.

With reference to FIG. 2A, the upright shaft 6 has its axis 6A at an angle with respect to the vertical axis 100. Thus, the bush 5 swivels about the axis 6A of the shaft 6 as opposed to the vertical axis 100. A plane of swiveling 101 of the wheel set is accordingly offset with respect to the horizontal 104.

Figure 4:
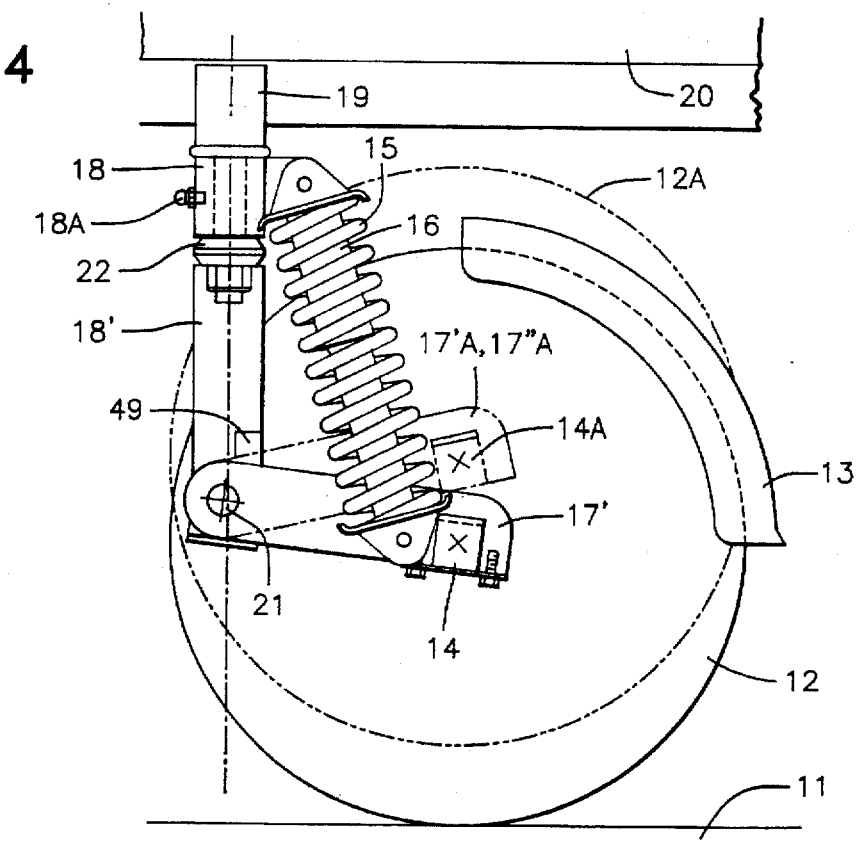
FIG. 4 is a side elevation on section IV—IV of FIG. 3 of second embodiment of a wheel set the invention.

In FIGS. 3 and 4 there is provided a tire 12 resting on a surface 11. The tire is joined by an axle 14 to a first arm 17'. The axle 14 extends through the arm 17' to a second arm 17" and in turn joins a second tire (not shown). By means of a hinge pin 21 the two side arms 17' and 17" are pivotally attached to two extensions 18' and 18" extending down from the bush 18 as is swivelably attached to an upright shaft 19. The bush is equipped with a grease nipple 18A for purposes of lubrication. The shaft 19 is attached to the underside of an extender 20. Attached to both the bush 18 and the two side arms 17' and 17" is a suspension device comprising a spring 15 and hydraulic shock absorber 16. Compression of the suspension device 15 and 16 allows the side arms 17' and 17", the axle 14 and tire 12 to move to positions 17'A, 17"A, 14A and 12A when the trailer 20 is under lead. A rebound limiter 49 is provided.

Figure 4A:
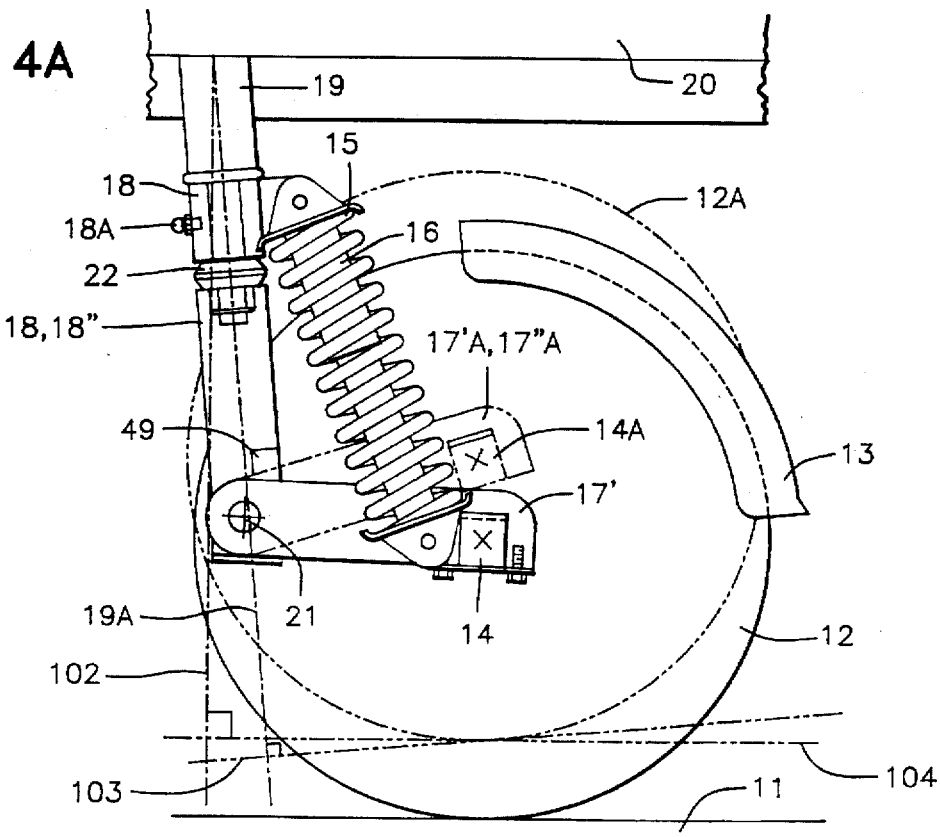
FIG. 4A is a side elevation illustrating a variation of the second embodiment wherein an upright shaft is at an angle with respect to the vertical.

With reference to FIG. 4A, the upright shaft 19 has its axis 19A at an angle with respect to the vertical axis 102. The bush 18 swivels about the axis 19A of the shaft 19 as opposed to the vertical axis 102. A plane of swivelling 103 of the wheel set is accordingly offset with respect to the horizontal 104.

Figure 5:
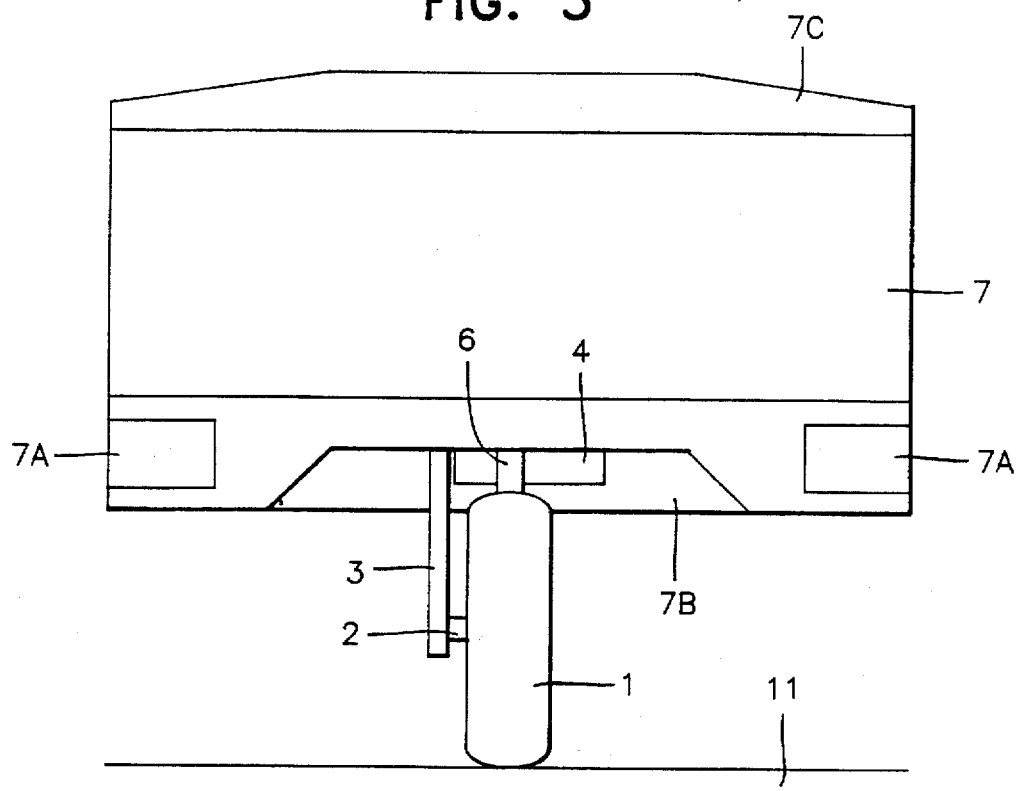
FIG. 5 is a front elevation of a trailer incorporating a first aspect of the invention.

FIG. 5 shows a vehicle extender 7 as seen from the rear, the extender having brake and indicator lights 7A and a lid 7C. The extender 7 is provided with a single lead bearing wheel set including a wheel 1, a suspension arm 3, a "RUBAX" suspension biasing unit 4, the "RUBAX" suspension biasing unit 4 connected to a upright shaft 6. The underside of the extender 7 is adapted at 7B to allow for the swivelling of the wheel 1 about the shaft 6.

Figure 6:
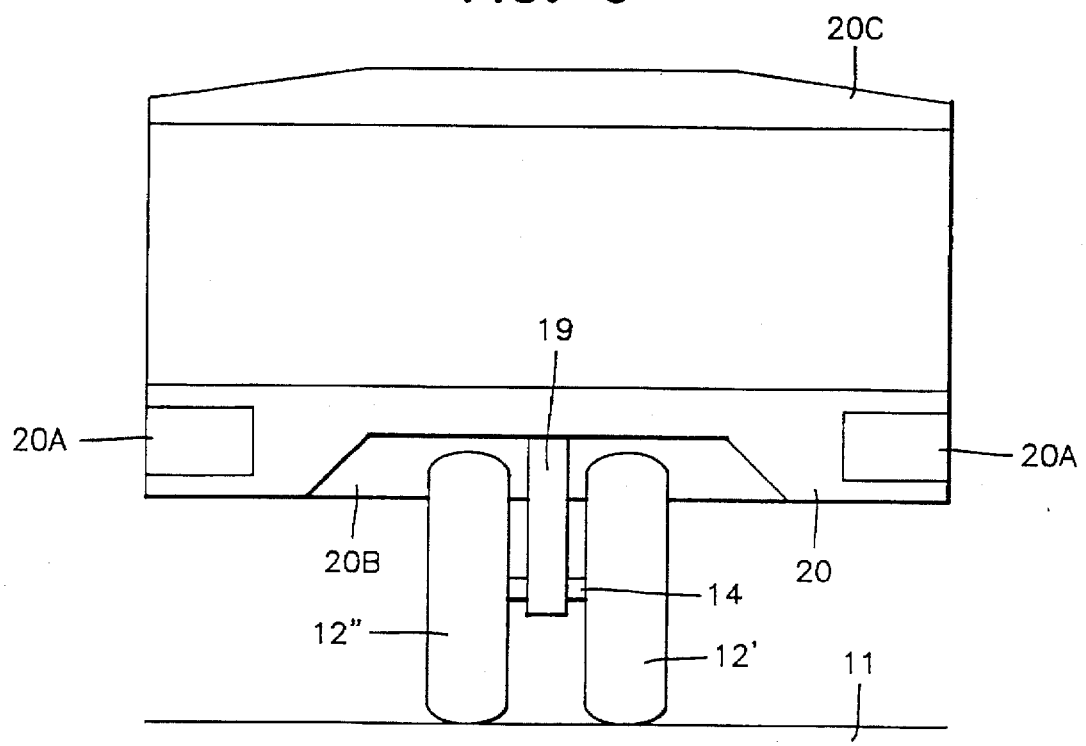
FIG. 6 is a front elevation of a trailer incorporating a second aspect of the invention.

FIG. 6 shows a vehicle extender 20 as seen from the rear, the extender having brake and indicator lights 20A and a lid 20C. The extender 20 is provided with a single lead bearing wheel set including two wheels 12' and 12", an axle 14 joining the two and an upright shaft 19 attached to the underside of the extender 20. The suspension device and side arms are not shown. The underside of the extender 20 is adapted 20B to allow for the swivelling of the wheels 12' and 12" about the shaft 19.

Figure 7:
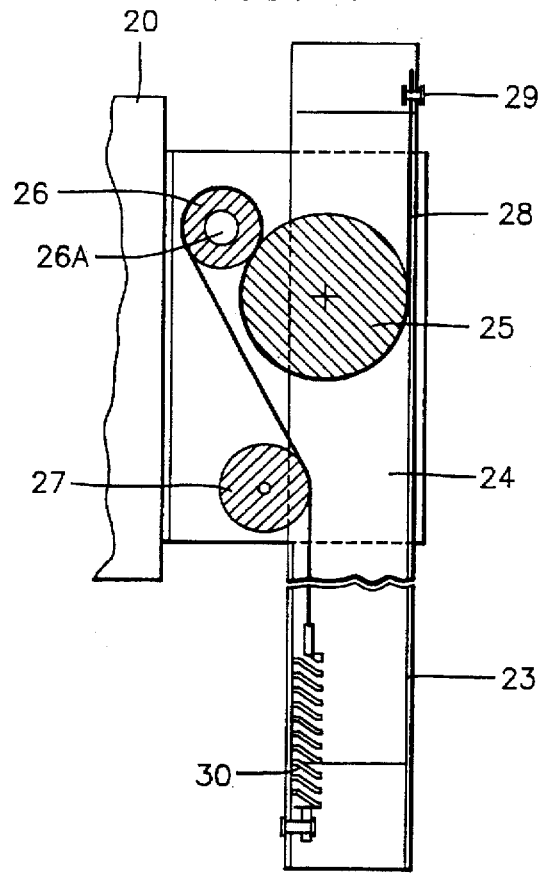
FIG. 7 is a side elevation on section VII—VII of a leg and leg retaining device for a trailer and FIG. 8 is a top view of a leg and leg retaining device.
Figure 8:
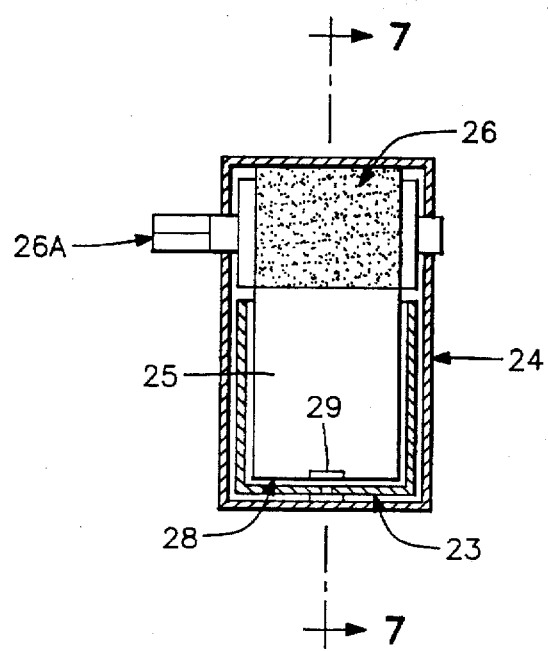

FIGS. 7 and 8 show a cross section U-shaped leg 23 of a vehicle extender(not shown) passing through a hoist box in the form of an open ended tube 24 which is fixed to the vehicle extended 20. Attached to the leg 23 at a back portion of the U is a carrier strap 28 attached to the leg by means of a rivet 29. The carrier strap extends down the length of the leg and around under a floating wheel 25 housed in the hoist box 24. The strap 28 passes over the top of a jack wheel 26 before passing over a guide wheel 27. The stray 28 is then attached to a tensioning spring 30 attached to a bottom portion of the leg 23. A square portion 26A of the jack wheel extends from the gear box type arrangement 24 facilitating attachment of a spanner (not shown) to the jack wheel 26 to allow for turning of the wheel 26.

When the jack wheel 26 is turned in an anti clockwise direction, the floating wheel 25 pushes the carrier strap 28 against a back portion of the leg 23 under a compressive action of the jack wheel 26. The floating wheel accordingly prevents slippage and the strap pulls the box 24 up. To lower the box 24 the jack wheel 26 is turned in a clockwise direction.

Figure 9:
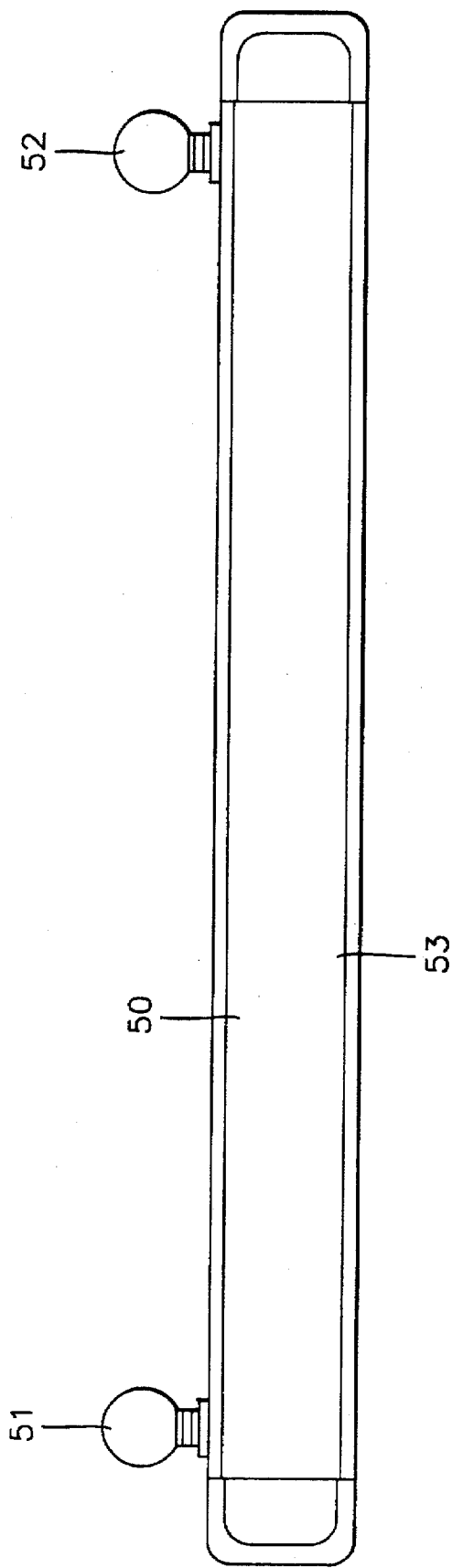
FIG. 9 is an elevation of a towing beam in accordance with the invention.

FIG. 9 shows a towing beam 50 which has two balls 51 and 52 fixed to it but the central part 53 of the beam has holes provided in it (not shown) for bolting on to a normal tow hitch attachment of a towing vehicle. To this tow hitch attachment is normally attached a single ball for towing a trailer but in accordance with the invention the beam 50 is attached instead of a single ball. This provides the two positions of connection of a vehicle extender in accordance with the invention. This is thus achieved by means of the beam 50 without need for any modification of the towing vehicle which has already provided on it a tow hitch attachment for a single ball connection of a trailer.

FIG. 10 shows a vehicle extender 54 which has an inclined front surface 55 providing a tapering form at the front for reduced wind resistance. The embodiment also shows the sockets 56 (in the side view the two sockets lie exactly one behind the other) which are to be attached to balls, for example, the balls 51 and 52 of the towing bar 50. The view shows an extendible jockey wheel 57, again there are in fact two, one on each side of the trailer seen exactly in line in this view. The embodiment also shows a single trailing wheel 58 which has a "motor cycle" type mudguard fixed to the wheel mountings to move up and down with the wheel. It will be seen how in this embodiment the wheel in the forward trailing position extends rearwardly of the vehicle extender being mounted sufficiently far back to ensure that the centre of gravity of the load if it is of the nature, for example, of a sand load will always lie ahead of the horizontal axis 60 of rotation of the wheel 58 even when the vehicle extender is pushed backwards and the castor action will swivel the wheel 58 around to a position in which the horizontal axis 60 is not as rearwardly located as in the view of FIG. 10. A mudguard 59 also is shown in FIG. 10.

FIG. 11 shows a further example of a vehicle extender 61 which is of convertible type as will be described with reference to further figures. Again there is the swivebly mounted wheel set 62 which in this example is a pair of wheels, the two sockets 63 the two jockey wheels 64 and a pair of catches 65 and 66 which allow attachment of differing upper parts to the base portion which has its upper edge at approximately level 67. It will be appreciated in this context that the floor of the unit, as is a case with the other embodiments is at approximately the level 68 so as to provide sufficient room underneath the vehicle extended body for the swivelling and rebound of the wheel set 62.

In the view of FIG. 11 the convertible unit 61 is provided with a top 69 which has a lid 70 hinged at 71 and with a catch and lock provision at 72. This then provides a unit analogous to that shown in FIG. 10 although of a larger size and can be used for locking away camping equipment, luggage, commercial items and the like as required. For these reasons the catches 65 and 66 have provision that they can also be padlocked.

FIG. 12 shows the same base unit 61 to which has been added a "camper" upper unit 73 which is provided With a hinge connection at 74 and retained for towing purposes by the latches 65 and 66. The illustration also shows the centroid 90 of the vehicle extender and how a gas bottle 75 can be mounted at the front of the actual extender. The vehicle extender can in this position be towed with camping gear stored in the unit as well as a tent (not shown).

FIG. 13 shows the top unit 73 swung over at the hinge 74 to the position shown in this view with the leg 76 extended and secured by a toggle 77 to support the swung over portion 73. A further leg 78 is also provided for the portion 61. To this unit is then added a tent 79 which is erected on it to provide for camping.

FIG. 14 shows the unit 61 with merely added to it the bars or poles 80 and 81 being mounted with the aid of the toggles 65 and 66. The tops of the bars 80 and 81 are at a level similar to the level of a cab of a towing vehicle, for example, in particular a light truck. This then provides the great advantage that a very long pole or poles or other structural steel bars or beams or the like which are considerably longer than the towing vehicle and therefore would be a traffic hazard and contrary to the traffic bye-laws can be then placed on the extended vehicle, resting on the cab of the towing vehicle and on the bars 80 and/or 81 of the vehicle extender.

FIG. 15 shows the same base unit 61 to which has been added a framework 82 which extends around all four sides of the vehicle extender providing an enclosure which can permit live stock to be carried in the vehicle extender. A tarpaulin 83 can also be provided to cover the top and four sides of the vehicle extender as required to provide an extended load space.

FIG. 16 shows the final possible adaptation of the base unit 61 where there is mounted on the base two fridge units 84 and 85 for refrigerated transport. The fridge units are shown by way of example as a box or bin type units with lids 86 and 87 and may be refrigerated by gas or electrical power as required.

I claim:

1. A vehicle extender provided with two horizontally spaced apart pivotal connectors for connection to a towing vehicle and adapted to restrict swingable movement of the vehicle extender relative to the towing vehicle, including structure defining a load space and a single caster attached to the vehicle extender, the caster swivelably attached to a rear portion of the vehicle extender so that a horizontal axis of rotation of a wheel of the caster does not extend forwardly of a centroid of the load space of the vehicle extender, the caster including:

a downwardly depending shaft attached to an underneath portion of the vehicle extender and;

a suspension device attached to the downwardly depending shaft, wherein:

an axis of the downwardly depending shaft is at a non-orthogonal angle with respect to said underneath portion of the vehicle extender so that the plane of swivelling of the caster is angularly offset with respect to said underneath portion of the vehicle extender, the axis of the downwardly depending shaft being in a vertical longitudinally directed plane and inclined forwardly.

2. The vehicle extender as claimed in claim 1, in which a bush swivels on the downwardly depending shaft, the bush carries the suspension device and the shaft has attached thereto a friction washer to dampen oscillation of the bush around the shaft.

3. The vehicle extender as claimed in claim 1, in which a front portion of the extender is tapered so as to present a narrow front edge expanding towards a rear of the vehicle extender.

4. The vehicle extender as claimed in claim 1, in which the caster has:

one wheel;

a bush is attached to and swivelable around the downwardly depending shaft and the bush carries the suspension device which comprises a single suspension arm.

5. The vehicle extender as claimed in claim 1, which comprises at least one extendible leg allowing for support of the vehicle extender when not attached to said towing vehicle, said at least one extendible leg being retained in both an extended and a retracted position by a carrier strap connected to the extendible leg and located in a hoist box fitted to the vehicle extender, the hoist box having a body part which is tubular in shape and allows the leg to pass through it.

6. The vehicle extender as claimed in claim 5, in which the hoist box includes the following:

a floating wheel;

a jack wheel rotatably mounted in the hoist box; and a guide wheel rotatably mounted in the hoist box, with the carrier strap passing successively around under the floating wheel, over a top of the jack wheel and over the guide wheel, the floating wheel located at a position below that of the jack wheel in the hoist box.

7. The vehicle extender as claimed in claim 6, in which the carrier strap is attached to an upper portion of said at least one leg above the hoist box, and is attached to a lower portion of said at least one leg, below the hoist box, by a tension spring.

8. The vehicle extender as claimed in claim 6, in which a shaft of the jack wheel extends out from the hoist box to facilitate turning of the jack wheel from outside of the hoist box.

* * * * *